(No Model.)
J. T. PEDERSĚN.
SLIP JOINT FOR DENTAL HANDPIECES.
No. 577,064. Patented Feb. 16, 1897.
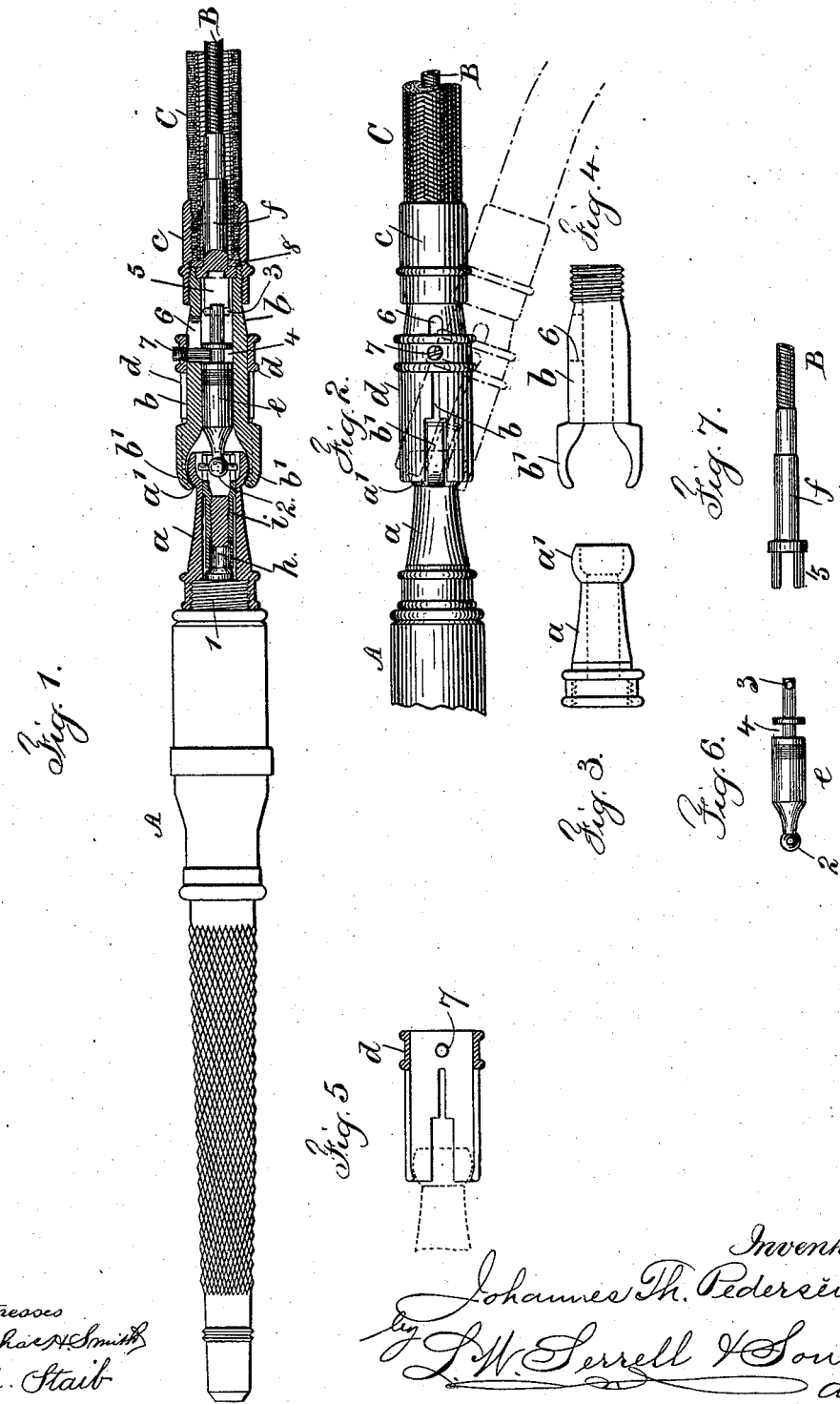

UNITED STATES PATENT OFFICE.

JOHANNES TH. PEDERSEN, OF WOODSIDE, NEW YORK.

SLIP-JOINT FOR DENTAL HANDPIECES.

SPECIFICATION forming part of Letters Patent No. 577,064, dated February 16, 1897.

Application filed March 2, 1896. Serial No. 581,506. (No model.)

*To all whom it may concern:*

Be it known that I, JOHANNES THEODOR PEDERSEN, a citizen of the United States, residing at Woodside, in the county of Queens and State of New York, have invented a new and useful Improvement in Slip-Joints for Dental Handpieces, of which the following is a specification.

My invention relates to a universal slip-joint coupling for connecting a dental handpiece and the flexible shaft of the dental engine, and the same is designed with particular reference and use in connection with the dental handpieces described and shown in Letters Patent granted to me January 7, 1896, No. 552,669, and in application filed by me January 6, 1896, Serial No. 574,423.

Heretofore in dental handpieces the flexible shaft of the dental engine has usually been connected directly to the back end of the handpiece or to a flexible coupling interposed between the shaft and handpiece, and when so used the wire helix of this coupling was so flexible that the same could be bent at quite a sharp angle, and in use this flexibility was a disadvantage, because under extra heavy pressure of the operating-tool against a hard surface the helix had a tendency to contract, or, in other words, wind up, and when the pressure was relieved the helix would unwind and come back to its normal position and cause a disadvantageous backlash of the operating-tool. The object of my present invention is to overcome this difficulty.

In carrying out my invention I am enabled to obtain any desired angular position of the tool-holder and shaft, and at the same time to use a stiffer and more rigid helix in the flexible shaft, that obviates the liability of an irregular motion of the tool, and thereby I maintain a uniform driving motion of the dental shaft.

In constructing my improved universal slip-joint coupling I employ a coupling having a globular head, and this is connected to the back end of the dental handpiece. I also employ a tubular bearing with claws, that is connected to the end of the flexible covering of the dental-engine shaft, and a sliding tubular clip surrounds and is longitudinally movable upon said tubular bearing, and the aforesaid globular head is entered laterally between said claws, and said tubular clip is sprung over said globular head in holding the parts together; and I provide a coupler movable longitudinally within the tubular bearing and having cross-pins at its respective ends adapted to connect at one end with a slotted sleeve and at the other end with a slotted head upon a stem connected to the flexible shaft from the dental engine, the details of the construction and operation of the parts being hereinafter more particularly described.

In the drawings, Figure 1 is an elevation of the dental handpiece and longitudinal section of the universal slip-joint coupling. Fig. 2 is a plan view of said slip-joint coupling. Fig. 3 is a plan of the screw-coupling and globular head; Fig. 4, a plan of the tubular bearing and claws; Fig. 5, a longitudinal section of the sliding clip; Fig. 6, a plan of the coupler, and Fig. 7 a plan of the stem and slotted head upon the end of the flexible shaft.

A represents the dental handpiece, and 1 the screw-coupling at the back end thereof, and $h$ the shaft of said dental handpiece, and $i$ a sleeve having a slotted end and adapted to screw upon said handpiece-shaft $h$.

$a$ represents the tubular coupling, and $a'$ its globular head. This coupling $a$ is screwed to the dental handpiece at the screw-coupling 1 and the same surrounds the sleeve $i$.

$b$ represents the tubular bearing with claws $b'$ projecting therefrom at opposite sides, the inner faces of the claws corresponding generally to the curved surface of the globular head $a'$. This tubular bearing $b$ is screw-threaded at the rear end and provided with a slot or mortise at 6.

B represents part of the flexible dental-engine shaft, and C part of the flexible covering therefor, and $c$ a sleeve connected to said flexible covering and screwing upon the end of the tubular bearing $b$ to connect the same to said flexible covering C.

$d$ represents the sliding tubular clip surrounding the tubular bearing $b$. This tubular clip is longitudinally slotted at opposite sides for part of its length to form spring-jaws whose inner faces at the extreme ends are contracted, so as to make the end diameter slightly smaller than the inner diameter of the clip to adapt the same to spring over and engage the globular head $a'$. A pin 7 passes through this tubular clip and through the slot 6 in the tubular bearing $b$ for the purposes hereinafter described.

$e$ represents the coupler fitted to slide within the tubular bearing $b$, and the same is provided at one end with a head 2 and cross-pin and at the other end, which is of reduced diameter, with a cross-pin 3 and with an annular groove 4, into which the inner end of the pin 7 projects to cause said coupler to be longitudinally moved in the tubular bearing $b$ with the sliding tubular clip $d$, and when the parts are placed together the head 2 occupies a central position in the globular head $a'$.

The stem $f$ is securely fastened to one end of the flexible dental-engine shaft B, and the other end of said stem is provided with a slotted head 5, and when the parts are connected, as shown in Fig. 1, the collar of the head 5 comes into the recessed end of the tubular bearing $b$, and a washer 8 back of said collar comes within and against a shoulder of the sleeve $c$ of the flexible covering C to prevent a longitudinal movement of these parts. The cross-pin 3 is received in the slotted head 5 and the head and cross-pin 2 are adapted to be received in the slotted end of the sleeve $i$, so that the rotation of the dental-engine shaft B is positively communicated through the coupler $e$ to the handpiece-shaft $h$.

In the handpiece shown in Figs. 1 and 2 the parts are coupled together and the parts may be moved in any direction to about the angle shown by the dotted lines in Fig. 2. To uncouple the handpiece, the tubular clip is forcibly moved toward the flexible shaft C. This springs its yielding end over and off of the globular head $a'$ and through the pin 7 moves the coupler $e$ away from said globular head, so that its cross-pin 3 is at the base of the slot in the head 5, and the head and cross-pin 2 are free from the globular head $a'$, which head can then be moved out laterally from between the claws $b'$ to separate the parts. To couple the parts, said globular head is introduced between said claws $b'$ and the tubular clip $d$ slid along and its yielding end sprung over the globular head $a'$, which movement also imparts a longitudinal movement to the coupler $e$ to bring the head and cross-pin 2 thereof into engagement with the slotted end of the sleeve $i$. These operations are quickly performed. The parts are strong and cannot accidentally be uncoupled, and the universal slip-joint coupling allows the handpiece to be moved freely, and the flexible dental-engine shaft B does not need to be bent as much as in the devices usually heretofore employed, and the hand of the operator is relieved from unnecessary strain.

I am aware that a handpiece has heretofore been employed the object of which was to obtain any desired angular position of the tool-holder in its relation to the flexible shaft, but the same is dissimilar in construction to my device and besides proposes to use a flexible shaft of usual construction.

I claim as my invention—

1. The combination with the shaft of the dental handpiece, the flexible driving-shaft to the dental engine, a coupling connection between the ends of the respective shafts, and a handpiece having a globular head upon its rear end, of a tubular bearing and a connection therefrom to the covering of the flexible driving-shaft of the dental engine, said tubular bearing having claws engaging the globular head upon opposite sides and a longitudinally-movable tubular clip surrounding said tubular bearing and adapted to be sprung over the globular head to engage and connect the parts, substantially as specified.

2. The combination with the case of the dental handpiece and its shaft, the flexible shaft to the dental engine, and an internal coupler for connecting the ends of the respective shafts, of a coupling having a globular head connected upon the rear end of the handpiece-case, a tubular bearing and a connection therefrom to the covering of the flexible shaft of the dental engine, said tubular bearing having claws receiving between them and engaging the globular head upon opposite sides, and a longitudinally-movable tubular clip surrounding said tubular bearing and adapted to be sprung over the globular head to engage and connect the parts, and a connection from the tubular clip to the internal shaft-coupler, whereby said coupler is longitudinally moved simultaneously with the movement of said tubular clip, substantially as set forth.

3. The combination with the case of the dental handpiece and its operating-shaft, and the flexible driving-shaft and covering from the dental engine, of a longitudinally-movable coupler for operatively connecting the respective shafts, a coupling having a globular head at the rear end of the dental handpiece, a tubular bearing receiving the aforesaid coupler and having projecting claws between which the globular head is received laterally and a connection therefrom to the flexible covering, said tubular bearing being slotted at one side, a sliding tubular spring-clip surrounding the tubular bearing and adapted to be moved longitudinally and sprung over the globular head in connecting the parts together, a pin passing through said tubular clip and through the slot of the tubular bearing and engaging the internal coupler whereby said coupler can be moved longitudinally and simultaneously with the said tubular clip in engaging or disengaging the parts, substantially as set forth.

4. In a coupling for connecting dental handpieces and the flexible covering of the dental-engine shaft, the combination with a universal slip-joint coupling, of the handpiece-shaft $h$ slotted at its rear end, the stem $f$ slotted at its forward end, the flexible dental-engine shaft to which the stem is connected, a longitudinally-movable coupler and means for moving the same and devices connected with the respective ends of said coupler for engaging the slotted ends of the handpiece-shaft and the said stem $f$, substantially as set forth.

5. In a coupling for connecting dental handpieces and the flexible covering of the dental-engine shaft, the combination with a universal slip-joint coupling, of the handpiece-shaft $h$ slotted at its rear end, the stem $f$ slotted at its forward end, the flexible dental-engine shaft to which the stem is connected, a coupler provided at one end with a head 2 and cross-pin, and at the rear end which is of reduced diameter with a cross-pin 3 and with an annular groove 4, the said head and cross-pins respectively engaging the slotted end of the shaft $h$, and means for longitudinally moving the coupler substantially as set forth.

6. The combination with the dental handpiece, its shaft, the flexible shaft to the dental engine, and its covering, of a universal slip-joint coupling connecting the handpiece and the sleeve at the end of said flexible covering, a stem connected to the dental-engine shaft and having a collar and a washer 8 received between the rear end of the universal slip-joint coupling and the inner end of the connecting-sleeve and a universal coupler for connecting the shaft of the handpiece and the stem of the driving-shaft, substantially as set forth.

7. The combination with the dental handpiece and the screw-coupling $a$ and its globular head $a'$, of the tubular bearing $b$ having claws $b'$ projecting from one end and at opposite sides, the sliding tubular clip $d$ surrounding the tubular bearing $b$ and longitudinally slotted at opposite sides for part of its length to spring over the globular hand, the inner face of the extreme slotted end being of a diameter slightly smaller than the globular head so as to be sprung over said head, substantially as set forth.

Signed by me this 25th day of February, A. D. 1896.

JOHANNES TH. PEDERSEN.

Witnesses:
GEO. T. PINCKNEY,
HAROLD SERRELL.